(12) United States Patent
Fujii et al.

(10) Patent No.: US 8,203,813 B2
(45) Date of Patent: Jun. 19, 2012

(54) DISTRIBUTED POWER SUPPLY SYSTEM

(75) Inventors: Kansuke Fujii, Tokyo (JP); Toshiya Yamada, Kobe (JP); Masaki Katoh, Kobe (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 134 days.

(21) Appl. No.: 12/801,876

(22) Filed: Jun. 29, 2010

(65) Prior Publication Data

US 2010/0327822 A1 Dec. 30, 2010

(30) Foreign Application Priority Data

Jun. 30, 2009 (JP) ................................. 2009-155713

(51) Int. Cl.
*H02H 3/00* (2006.01)
(52) U.S. Cl. .......................................... 361/62; 361/65
(58) Field of Classification Search ............... 361/62–69
See application file for complete search history.

(56) References Cited

U.S. PATENT DOCUMENTS

| 6,573,690 B2 * | 6/2003 | Ogusa et al. ................... 323/207 |
| 7,075,274 B2 * | 7/2006 | Fujii et al. ..................... 323/207 |

FOREIGN PATENT DOCUMENTS

| JP | 07-031197 A | 1/1995 |
| JP | 08-084438 A | 3/1996 |
| JP | 08-331765 A | 12/1996 |
| JP | 09-128074 A | 5/1997 |
| JP | 11-356050 A | 12/1999 |
| JP | 2008-061356 A | 3/2008 |

* cited by examiner

*Primary Examiner* — Danny Nguyen
(74) *Attorney, Agent, or Firm* — Rabin & Berdo, P.C.

(57) ABSTRACT

During single operation of a distributed power supply system that has been disconnected from a commercial electric power system, a frequency increase monitoring circuit is operated and an instruction to output a larger amount of a constant reactive current is given to a reactive current controlling unit. After the output frequency of the distributed power supply exceeds a frequency increase level, the level of an active current is limited in accordance with the level of the outputted reactive current.

10 Claims, 4 Drawing Sheets

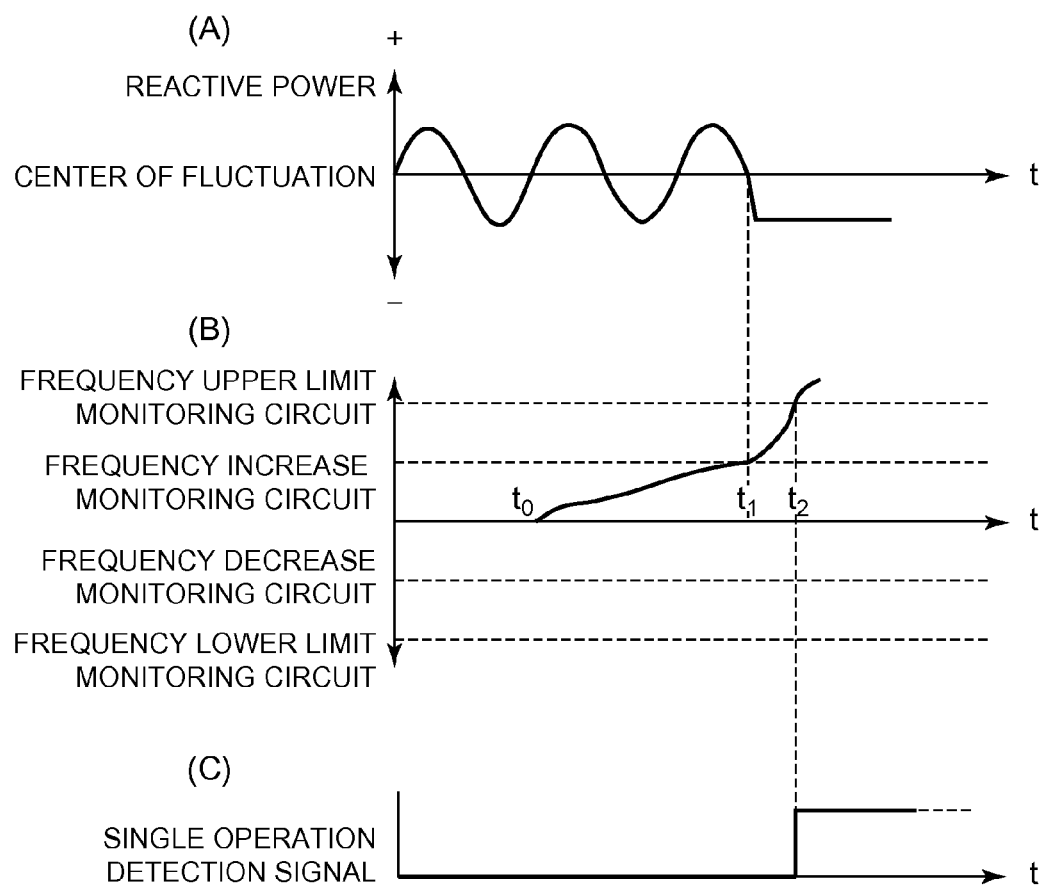

DISTRIBUTED POWER SUPPLY SYSTEM

CROSS-REFERENCE TO RELATED APPLICATION

This application claims the benefit of foreign priority of Japanese patent application number 2009-155713, filed on Jun. 30, 2009, the disclosure of which is incorporated herein by reference.

BACKGROUND OF THE INVENTION

The present invention relates to a distributed power supply system with a single operation detection function used between an electric power system and a power generating system such as a solar cell power generating system, a fuel cell power generating system, or wind power generating system. The single operation detection function is used to detect when the power generating system of the distributed power supply system is in single operation, without the electric power system.

Examples of a system configuration of a related system interconnecting inverter and a related single operation detecting unit are shown in FIG. 3 (see Japanese Patent No. 3353549). In the systems shown in FIG. 3, periodic minute fluctuations are given to a set value of a reactive power setting unit provided in a system interconnecting inverter in system interconnection to always periodically fluctuate reactive power at a system interconnecting point to thereby monitor the frequency of the signal at the system interconnecting point or the frequency of the signal of a system interconnecting inverter.

When a minute increase in the monitored frequency is detected, the generation of a minute signal in phase advance to the phase of the signal of the system interconnecting inverter further increases the monitored frequency when the system is in a single operation state. While, when a minute decrease in the monitored frequency is detected, the generation of a minute signal in phase delay to the phase of the signal of the system interconnecting inverter further decreases the monitored frequency when the system is in a single operation state. By giving attention to the phenomenon, a single operation phenomenon is to be surely and promptly detected.

In FIG. 3, a fuel cell power generation system 1 is formed of a fuel cell main unit 2, a system interconnecting inverter 3 and a distribution transformer 4. Reference numerals 5 and 6 denote a load and an electric power system, respectively. Moreover, reference numeral 7 denotes a circuit breaker for electric power distribution to the load 6, reference numeral 8 denotes a distributed power supply side circuit breaker for the fuel cell power generation system 1 as a distributed power supply, and reference numeral 9 denotes a power receiving point circuit breaker for receiving power from the distribution feeder of the electric power system 6.

Furthermore, a single operation detecting system 10 is formed of a frequency detecting circuit 11, including components such as a frequency to voltage converter, and a single operation detecting unit 20. The single operation detecting unit 20 is formed of a fluctuating signal generating circuit 21, a frequency increase monitoring circuit 22, a frequency decrease monitoring circuit 23, an OR circuit 24, a Schmitt circuit 25, a counter circuit 26, a negative polarity peak hold circuit 27, a positive polarity peak hold circuit 28, a switching circuit 29, a frequency upper limit monitoring circuit 30, a frequency lower limit monitoring circuit 31 and a single operation signal generating circuit 32.

Here, the fluctuating signal generating circuit 21 generates a periodic sinusoidal-wave-like minute signal. Each of the frequency increase monitoring circuit 22 and the frequency decrease monitoring circuit 23 includes a comparator and a setting unit, both for monitoring minute fluctuation of the value of the output of the frequency detecting circuit 11. The OR circuit 24 detects the operation of either of the frequency increase monitoring circuit 22 or the frequency decrease monitoring circuit 23. The Schmitt circuit 25 converts the output of the fluctuating signal generating circuit 21 to a pulsed wave signal. The counter circuit 26 carries out counting of the pulsed wave signal. The negative polarity peak hold circuit 27 is operated as a phase advanced signal generating circuit holding the negative polarity peak value of the output signal of the fluctuating signal generating circuit 21. The positive polarity peak hold circuit 28 is operated as a phase delayed signal generating circuit holding the positive polarity peak value of the output signal of the fluctuating signal generating circuit 21. The switching circuit 29 includes components such as an AND/OR gate circuit and three state buffers and, when any one of the frequency increase monitoring circuit 22, the frequency decrease monitoring circuit 23 and the counter circuit 26 outputs a signal, carries out switching so that one of the fluctuating signal generating circuit 21, the negative polarity peak hold circuit 27 and the positive polarity peak hold circuit 28, corresponding to the circuit outputting the above signal, is selected to output a signal by which minute fluctuation is given to a set value of an unillustrated reactive power setting unit in the system interconnecting inverter 3. Each of the frequency upper limit monitoring circuit 30 and the frequency lower limit monitoring circuit 31 includes a comparator and a setting unit for always giving the reactive power at a power receiving point A minute fluctuation and monitoring the deviation of the output frequency of the frequency detecting circuit 11 from the specified reference frequency. The single operation signal generating circuit 32 includes an OR gate generating a single operation signal when either the frequency upper limit monitoring circuit 30 or the frequency lower limit monitoring circuit 31 is operated.

FIG. 4 is a waveform diagram showing the operation of the system shown in FIG. 3.

In FIG. 4, when the electric power system 6 is disconnected by the power receiving point circuit breaker 9 due to an accident on the electric power system side at the time t0 shown in (B) in FIG. 4 with an amount of generated power supplied from the system interconnecting inverter 3 in the fuel cell power generation system 1 being balanced with an amount of the power consumed in the load 5, a single operation phenomenon is caused between the fuel cell power generation system 1 and the load 5.

In such a state, with a setting provided so that the fluctuating signal generating circuit 21 and the switching circuit 29 give a reactive power fluctuation to the system interconnecting inverter 3 and, as shown in (A) in FIG. 4, the fuel cell power generation system 1 gives a reactive power fluctuation in more phase delay to the phase of the reactive power in the disconnected electric power system 6 with the fluctuation being in the positive (+) polarity and the fuel cell power generation system 1 gives a reactive power fluctuation in more phase advance to the phase of the reactive power in the disconnected electric power system 6 with the fluctuation being in the negative (−) polarity, an increase in frequency as shown in (B) of FIG. 4 occurs between time t0 and t1. This operates the frequency increase monitoring circuit 22 at time t1 to make the waveform of the reactive power fluctuation at the power receiving point A as the waveform of the output of the negative polarity peak hold circuit 27 by the switching circuit 29 (see (A) of FIG. 4).

The frequency fluctuation at this time is enlarged as the fluctuation value between the time t1 and the time t2 shown in (B) of FIG. 4. Hence, at the time t2 shown in (B) of FIG. 4, the frequency upper limit monitoring circuit 30 is operated, by which a single operation phenomenon is detected by the single operation signal generating circuit 32 (see (C) in FIG. 4).

[Patent Document 1] Japanese Patent No. 3353549, corresponding to published Japanese application 08-331765:

As was explained above, in the distributed power supply system disclosed in Japanese Patent No. 3353549 (the disclosure of which is incorporated herein by reference), when the frequency increase monitoring circuit 22 is operated, a reactive current is outputted that fluctuates with the frequency fluctuation. However, reactive currents at some levels cannot promptly vary the level to the level of abnormal frequency. Thus, a reactive current with a capacity of tens of percent or more of the capacity of a converter must be outputted. At this time, however, the value of the total of an active current and the reactive current sometimes exceeded the rated value of the system to result in an overcurrent state. A measure for avoiding the overcurrent state is to enlarge the volume of the system. This, however, decreases the utilization factor of the system under normal conditions to cause a problem of making the system disadvantageous in cost and the volume of the system.

SUMMARY OF THE INVENTION

Accordingly, an object of the invention is to construct an inverter control system in a distributed power supply having a single operation detecting function without increasing the volume of the system, the inverter control system promptly varying a frequency to a frequency upper limit monitoring level after a frequency increase detector is operated.

For solving the above problem, the invention constructs a distributed power supply system interconnected to an electric power system and outputting generated power. The system includes: a distributed power supply; a reactive current controlling unit outputting a minute reactive current when the electric power system is normal; an active current controlling unit; a PLL (Phase-Locked-Loop) circuit that controls an output frequency; and a frequency increase monitoring circuit monitoring that an output frequency of the distributed power supply has exceeded a frequency increase level with the electric power system brought into an interruption state. The frequency increase monitoring circuit, when operated, gives an instruction to output a larger amount of a constant reactive current to the reactive current controlling means and, after the output frequency of the distributed power supply exceeds the frequency increase level, limits the level of an active current in accordance with the level of the outputted reactive current, and further, makes the response speed of the PLL circuit higher.

In the invention, by limiting an amount of the active current after the output frequency of the distributed power supply exceeds a frequency increase level, the load and an amount of an active current become out of balance to cause the frequency to vary faster. Furthermore, by increasing the proportional gain of the PLL, the effect of varying the frequency faster is enhanced. As a result, without increasing the volume of the system, it becomes possible to promptly vary the level of the frequency up to a frequency upper limit monitoring level.

BRIEF DESCRIPTION OF THE DRAWINGS

FIG. 4 is a waveform diagram showing the operation of the system shown in FIG. 3.

DESCRIPTION OF TILE PREFERRED EMBODIMENT

The main point of the invention is that, in a distributed power supply system interconnected to an electric power system for outputting generated power to the electric power system, a minute reactive current is outputted when the electric power system is normal, a larger amount of a constant reactive current is outputted when it is detected that the output frequency of the distributed power supply exceeds a frequency increase level when the electric power system is brought into an interruption state (that is, when the electric power system is disconnected and the distributed power supply system is in a single operation situation), and an amount of active current is limited in accordance with an amount of the outputted reactive current after the output frequency of the distributed power supply exceeds the frequency increase level, and further, the response speed of a PLL circuit is increased.

Figure 1:
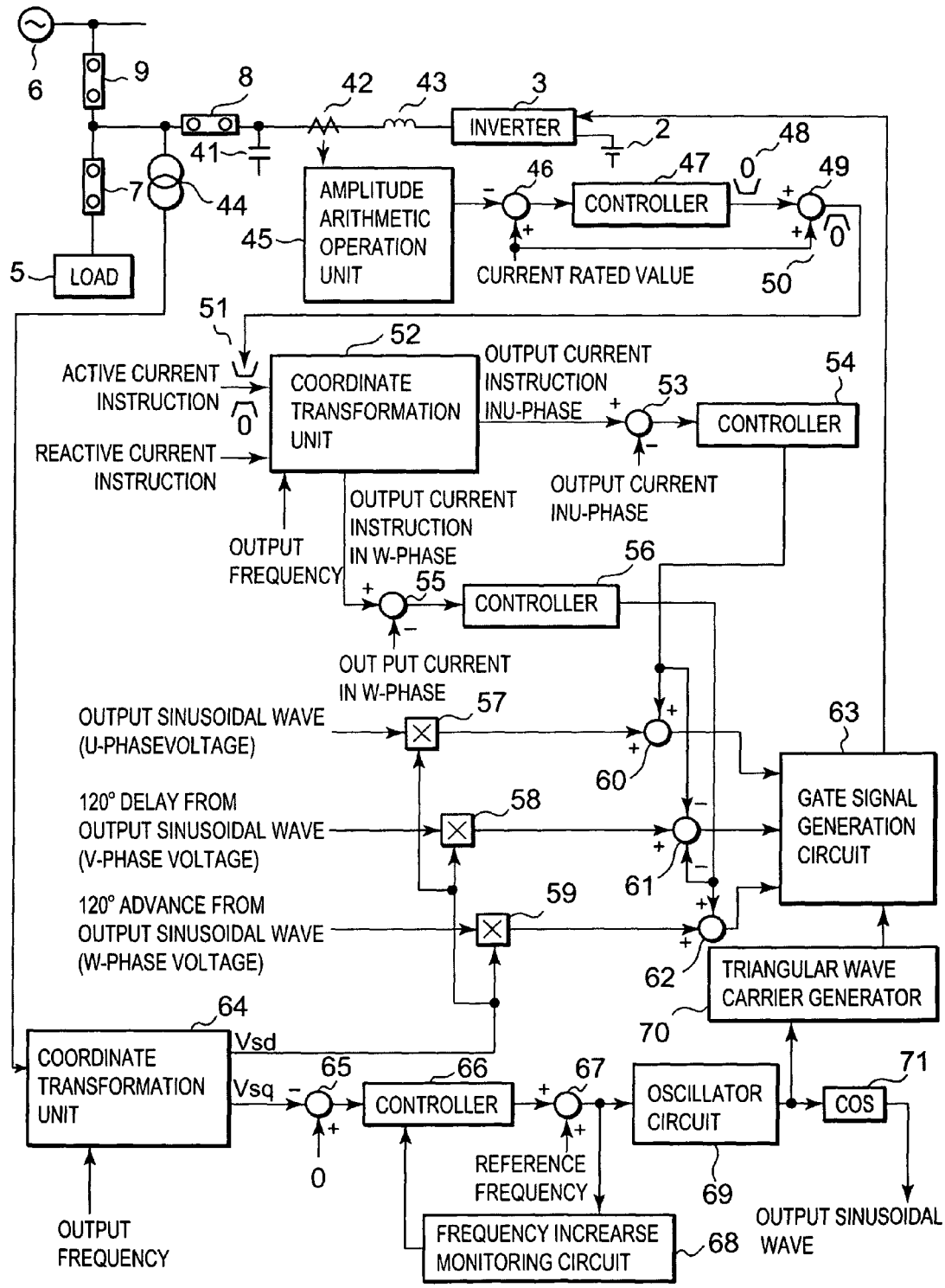
FIG. 1 is a block diagram showing the circuit of an embodiment of a distributed power supply system according to the invention.

FIG. 1 is a block diagram showing the circuit of an embodiment of a distributed power supply system according to the invention. On the output side of a system interconnecting inverter 3 with a power generating system such as fuel cell main unit 2 connected thereto, a filter formed of a reactor 43 and a capacitor 41 is connected. This filter is connected to an electric power system 6 through a distributed power supply side circuit breaker 8 and a power receiving point circuit breaker 9. Reference numerals 5 and 7 denote a load and a circuit breaker for electric power distribution to the load, respectively.

In a control system for an inverter in a distributed power supply with a single operation detection function, the system side voltage of the distributed power supply side circuit breaker 8 is detected by using a voltage detector 44. The detected system side voltage is subjected to coordinate transformation on an output frequency basis by a coordinate transformation unit 64 to be converted into a component in-phase with the system voltage (Vsd) and a component 90° out of phase with the system voltage (Vsq). In a PLL circuit that determines an output frequency, the deviation of the value of the component Vsq from an instruction value of zero degrees is obtained by a subtractor 65 to be inputted in a controller 66, the output of which is added to a reference frequency value (50 Hz or 60 Hz, for example) by an adder 67. The output of the adder 67 is then inputted to an oscillator circuit 69 to carry out an operation for obtaining a signal equivalent to $\omega t$ ($\omega$: angular frequency, t: time), which is inputted to a trigonometric function (cosine, for example) circuit 71. The output of the trigonometric function circuit 71 is taken as an instruction signal for the output sinusoidal wave of the inverter 3.

With the inverter and the system being in synchronization with each other, the signal Vsq becomes zero. Furthermore, the controller 66 is normally formed of a PI controller and, when a frequency increase monitoring circuit 68 is operated, enhances a transient response characteristic by its advantages such as an increase in a proportional gain and a decrease in an integral time to increase the amount of the output of the controller to the value of Vsq.

Next, a method of limiting an active current (that is, the current supplied by the inverter 3, or the total current less the reactive current) will be described. The output current of the inverter 3 is detected by a current detector 42 between the capacitor 41 and the reactor 43. The value of the detected output current is inputted to an amplitude arithmetic operational unit 45 to thereby perform an arithmetic operation for obtaining the value of the total current amplitude.

The deviation of the obtained value of current amplitude from the rated value of current is obtained by a subtractor 46 to be inputted to a controller 47. The output of the controller 47 is subjected to upper limiting in a limiter circuit 48 with zero taken as the upper limit value before being added to the rated value of current by an adder 49. The output of the adder 49 is subjected to lower limiting in a limiter circuit 50 with zero taken as the lower limit value.

The two limiter circuits 48 and 50 are used for obtaining an active current limiter value which limits an active current with the rated value of current when a reactive current is small and limits the active current to zero when the reactive current is large. The result of the operation is inputted to an upper and lower limiter 51, in which a lower limit is taken as zero and an upper limit is taken as the above active current limiter value, to carry out a limiter operation for a limiting active current instruction. The active current instruction sometimes becomes a controller output for controlling the DC voltage of the inverter to be constant and sometimes becomes an active current determined by generated power.

Next, a reactive current instruction is a signal of a minute value made periodically fluctuated by a method similar to that disclosed in Japanese Patent No. 3353549 and, after the frequency increase monitoring circuit is operated, becomes a signal with a constant value of advance or delay corresponding to the value of varying frequency. Since the operation is the same as that disclosed in Japanese Patent No. 3353549, which was discussed above in the "Background of the Invention" section, its explanation will be omitted here.

The above described active current instruction and reactive current instruction are inputted to a coordinate transformation unit 52 with the value of an output frequency taken as a reference to carry out operations for obtaining an output current instruction in a U-phase and an output current instruction in a W-phase. A deviation of the output current instruction in the U-phase from a detected value of the output current in the U-phase is obtained by a subtractor 53 to be inputted to a controller 54. The output of the controller 54 is added in an adder 60 to a sinusoidal wave signal, obtained by carrying out multiplication of the output Vsd of the coordinate transformation unit 64 and a reference output sinusoidal wave for the U-phase by a multiplier 57, by which a U-phase voltage instruction signal is obtained.

Moreover, a deviation of the output current instruction for the W-phase from a detected value of an output current in the W-phase is obtained by a subtractor 55 to be inputted to a controller 56. The output of the controller 56 is added by an adder 62 to a sinusoidal wave signal, obtained by carrying out multiplication of the output Vsd of the coordinate transformation unit 64 and a reference output sinusoidal wave for the W-phase by a multiplier 59, by which a W-phase voltage instruction signal is obtained.

Furthermore, the respective outputs of the controller 54 for the U-phase and the controller 56 for the W-phase are subtracted by a subtractor 61 from a sinusoidal wave delayed by 120° from the output sinusoidal wave (a sinusoidal wave obtained by carrying out multiplication of the output Vsd of the coordinate transformation unit 64 and a reference sinusoidal wave for the V-phase by a multiplier 58), by which a V-phase voltage instruction signal is obtained. By using the three phase voltage instruction signals together with a carrier signal obtained from the output frequency by a triangular wave carrier generator 70, PWM (Pulse Width Modulation) is carried out to generate a gate pulse signal for the inverter 3 in a gate signal generation circuit 63.

Figure 2:
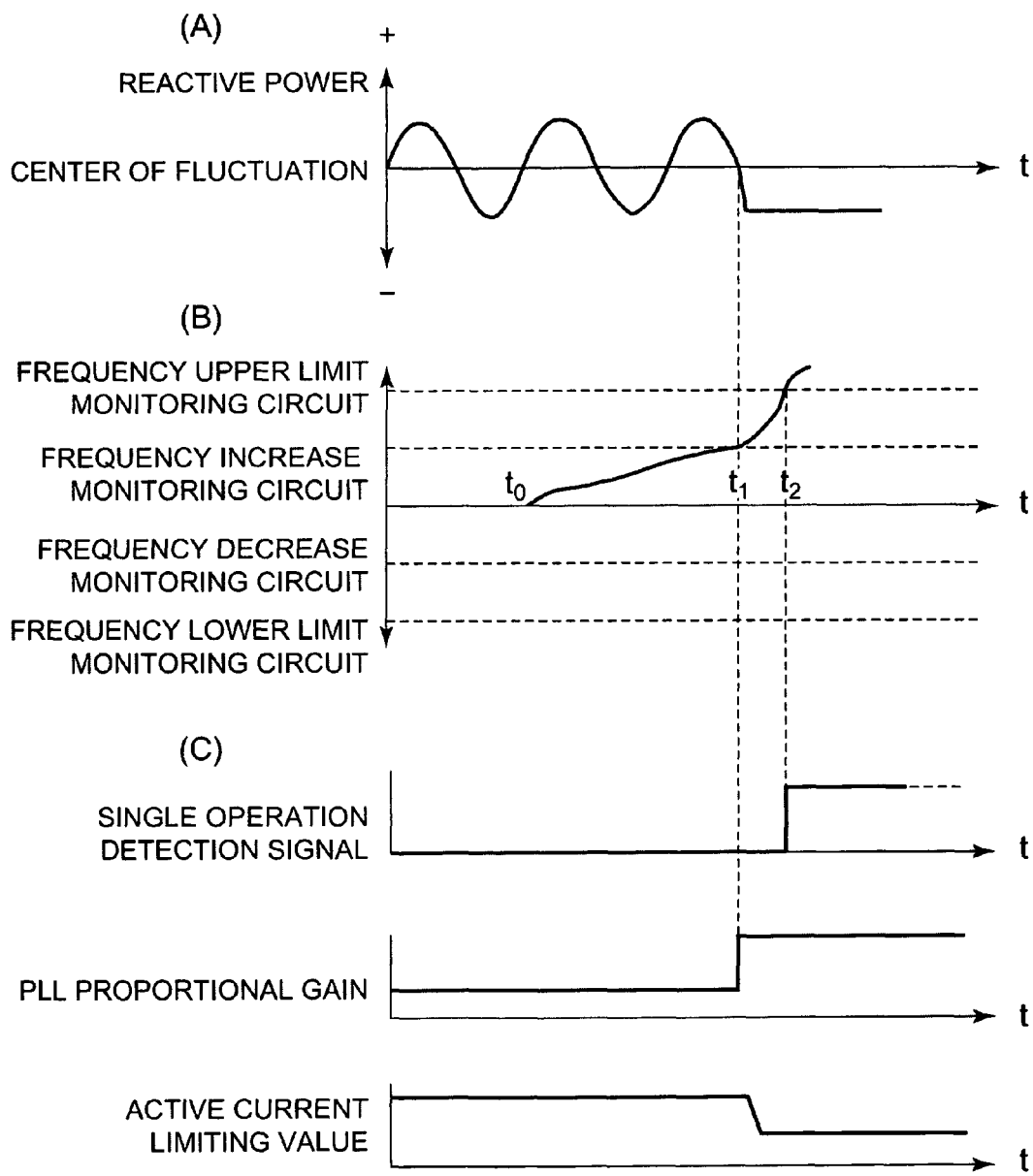
FIG. 2 is a waveform diagram showing the operation of the distributed power supply system shown in FIG. 1.
Figure 3:
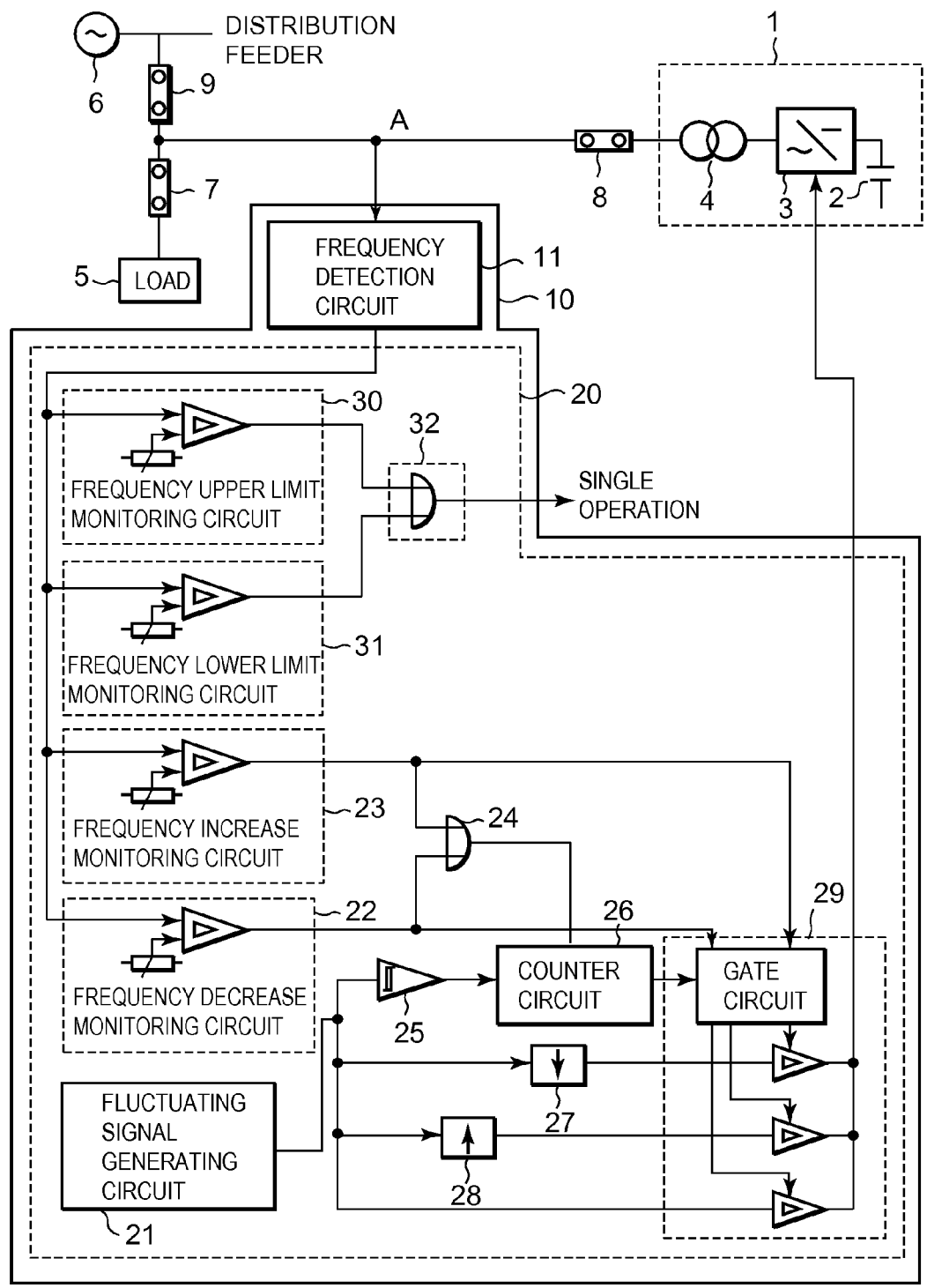
FIG. 3 is a block diagram showing examples of a system configuration of a related system interconnecting inverter and a related single operation detecting unit.

FIG. 2 is a waveform diagram showing the operation of the distributed power supply system shown in FIG. 1. The waveforms are obtained from the above operation. In (B) of FIG. 2, when the sum of the reference frequency and the output of the controller 66 exceeds a frequency increase level at time t1, the proportional gain of the PLL increases to increase the reactive current. In correspondence with this, the active current limiting value decreases to promptly vary the frequency while avoiding an overcurrent state. By detecting the increase in frequency by the frequency upper limit monitoring circuit 68, a single operation condition can be surely detected. As was explained above, the active current is limited in correspondence with the variation in the level of the reactive current, by which a single operation condition can be detected without increasing the capacity of the system.

While the present invention has been particularly shown and described with reference to the preferred embodiment thereof, it will be understood by those skilled in the art that the foregoing and other changes in form and details can be made therein without departing from the spirit and scope of the present invention.

What is claimed is:

1. A distributed power supply system interconnected to an electric power system and outputting generated power, the system comprising:
    a distributed power supply;
    a reactive current controlling means outputting a minute reactive current when the electric power system is normal;
    an active current controlling means;
    a PLL circuit that controls an output frequency; and
    a frequency increase monitoring circuit monitoring an output frequency of the distributed power supply to determine whether the output frequency has exceeded a frequency increase level when power from the electric power system is interrupted,
    wherein the frequency increase monitoring circuit, when operated, generates an instruction to output an increased amount of a constant reactive current to the reactive current controlling means and, after the output frequency of the distributed power supply exceeds a frequency increase level, to limit the level of an active current in accordance with the level of the outputted reactive current.

2. The distributed power supply system as claimed in claim 1, wherein the PLL circuit comprises a proportional plus integral controller, and has a response speed that is increased by at least one of an increase in a proportional gain and a decrease in an integral time of the proportional plus integral controller.

3. The distributed power supplying system as claimed in claim 1, further comprising an inverter that is connected to the distributed power supply.

4. The distributed power supply system as claimed in claim 3, further comprising a first circuit breaker and a second circuit breaker that is connected to the first circuit breaker at an intermediate connection node, the first circuit breaker additionally being connected to the electric power system and the second circuit breaker being connected between the inverter and the intermediate connection node.

5. The distributed power supply system as claimed in claim 4, further comprising a third circuit breaker that is connected between the intermediate connection node and a load.

6. The distributed power supply system as claimed in claim 4, further comprising a voltage detector connected to the intermediate connection node and a coordinate transformation unit having an input port that is connected to the voltage detector, the coordinate transformation unit having a first output port that supplies a signal that is in phase with a system voltage and a second output port that supplies a signal that is 90 degrees out of phase with the system voltage.

7. The distributed power supply system as claimed in claim 4, wherein the PLL comprises means for finding the difference between the signal that is 90 degrees out of phase with the system voltage and a signal that is zero degrees out of phase with the system voltage.

8. The distributed power supply system as claimed in claim 7, further comprising an inverter that is connected to the distributed power supply and a gate signal generation circuit that supplies gate signals to the inverter, and wherein the active current controlling means supplies input signals for a U phase, a V phase, and a W phase to the gate signal generation unit.

9. The distributed power supply system as claimed in claim 8, wherein the active current controlling means further comprises a current detector that is connected between the second circuit breaker and the inverter, and means connected to the current detector for setting an active current limit value.

10. The distributed power supply system as claimed in claim 1, wherein the distributed power supply comprises a fuel cell main unit.

* * * * *